No. 739,897. PATENTED SEPT. 29, 1903.
T. MOESINGER.
CIGARETTE MACHINE.
APPLICATION FILED MAR. 13, 1900. RENEWED MAR. 6, 1902.
NO MODEL. 10 SHEETS—SHEET 1.

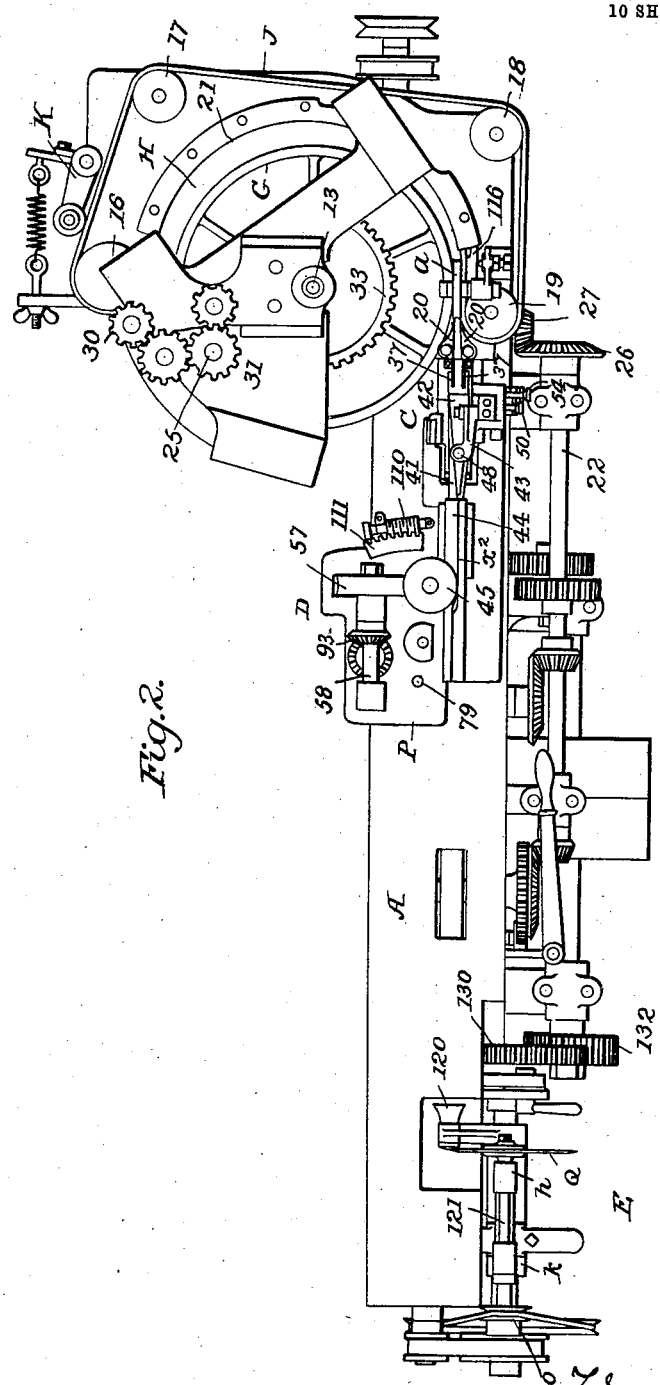

No. 739,897. PATENTED SEPT. 29, 1903.
T. MOESINGER.
CIGARETTE MACHINE.
APPLICATION FILED MAR. 13, 1900. RENEWED MAR. 6, 1902.
NO MODEL. 10 SHEETS—SHEET 3.
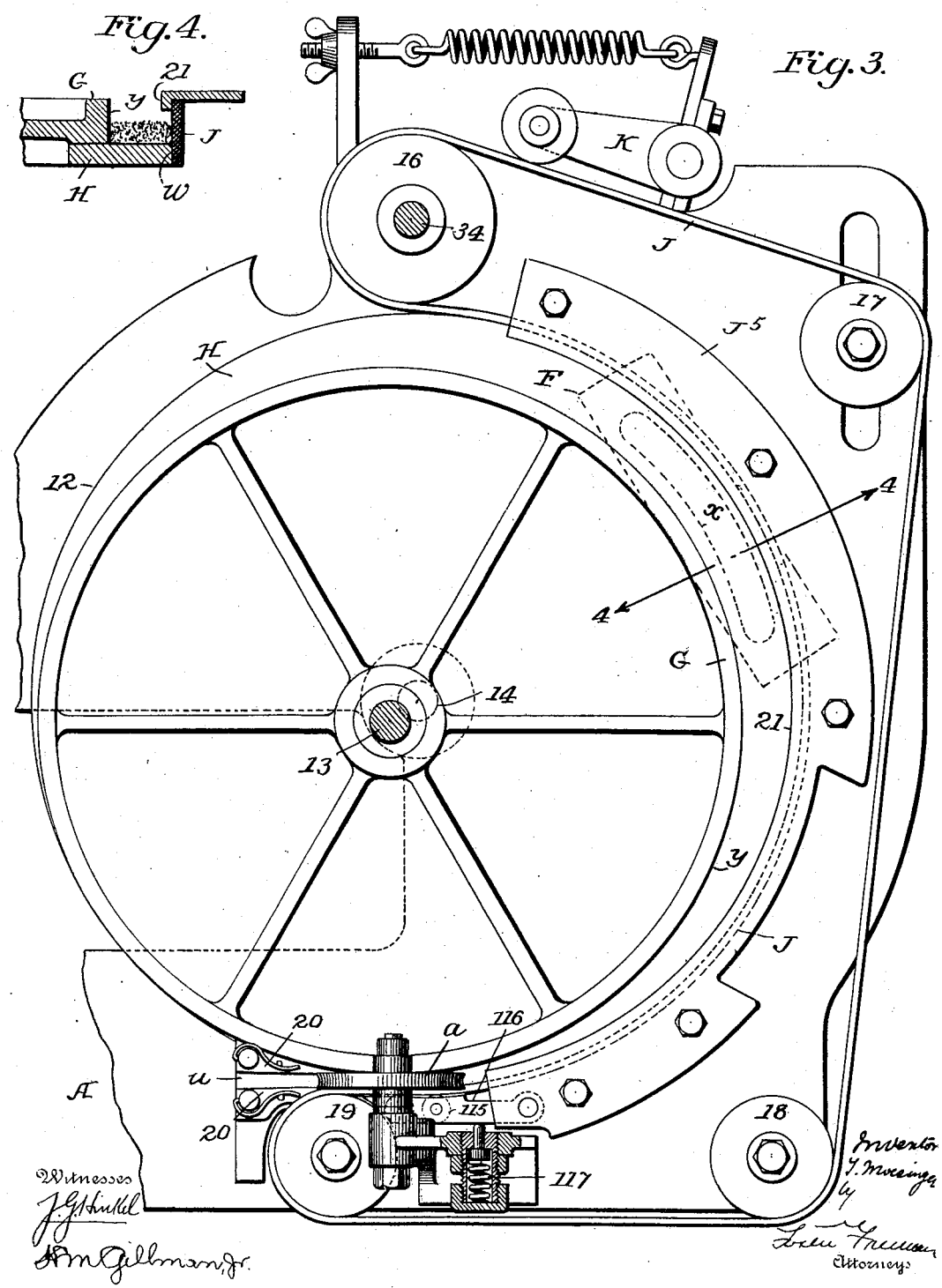

No. 739,897. PATENTED SEPT. 29, 1903.
T. MOESINGER.
CIGARETTE MACHINE.
APPLICATION FILED MAR. 13, 1900. RENEWED MAR. 6, 1902.
NO MODEL. 10 SHEETS—SHEET 4.
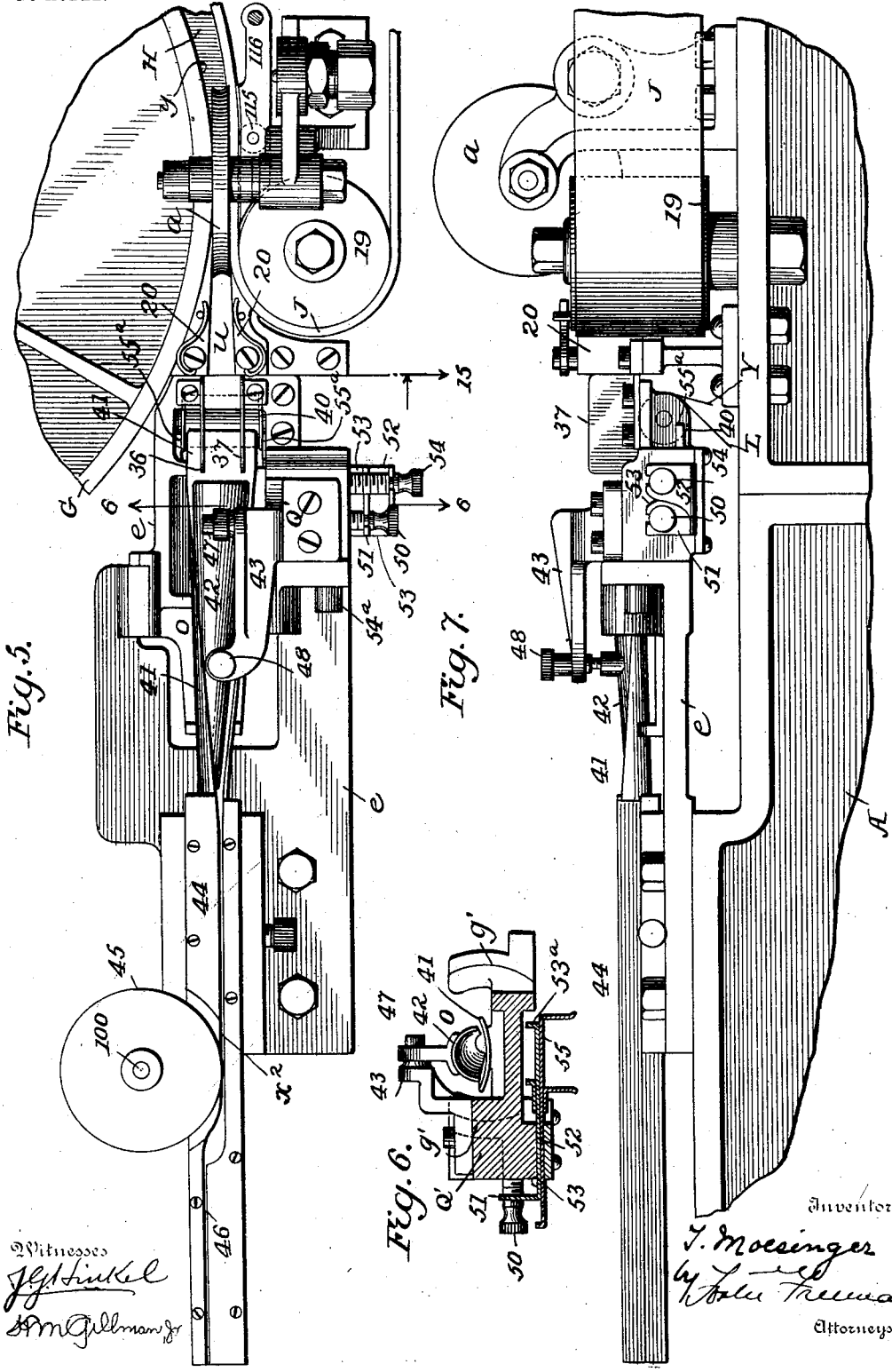

No. 739,897. PATENTED SEPT. 29, 1903.
T. MOESINGER.
CIGARETTE MACHINE.
APPLICATION FILED MAR. 13, 1900. RENEWED MAR. 6, 1902.
NO MODEL. 10 SHEETS—SHEET 5.

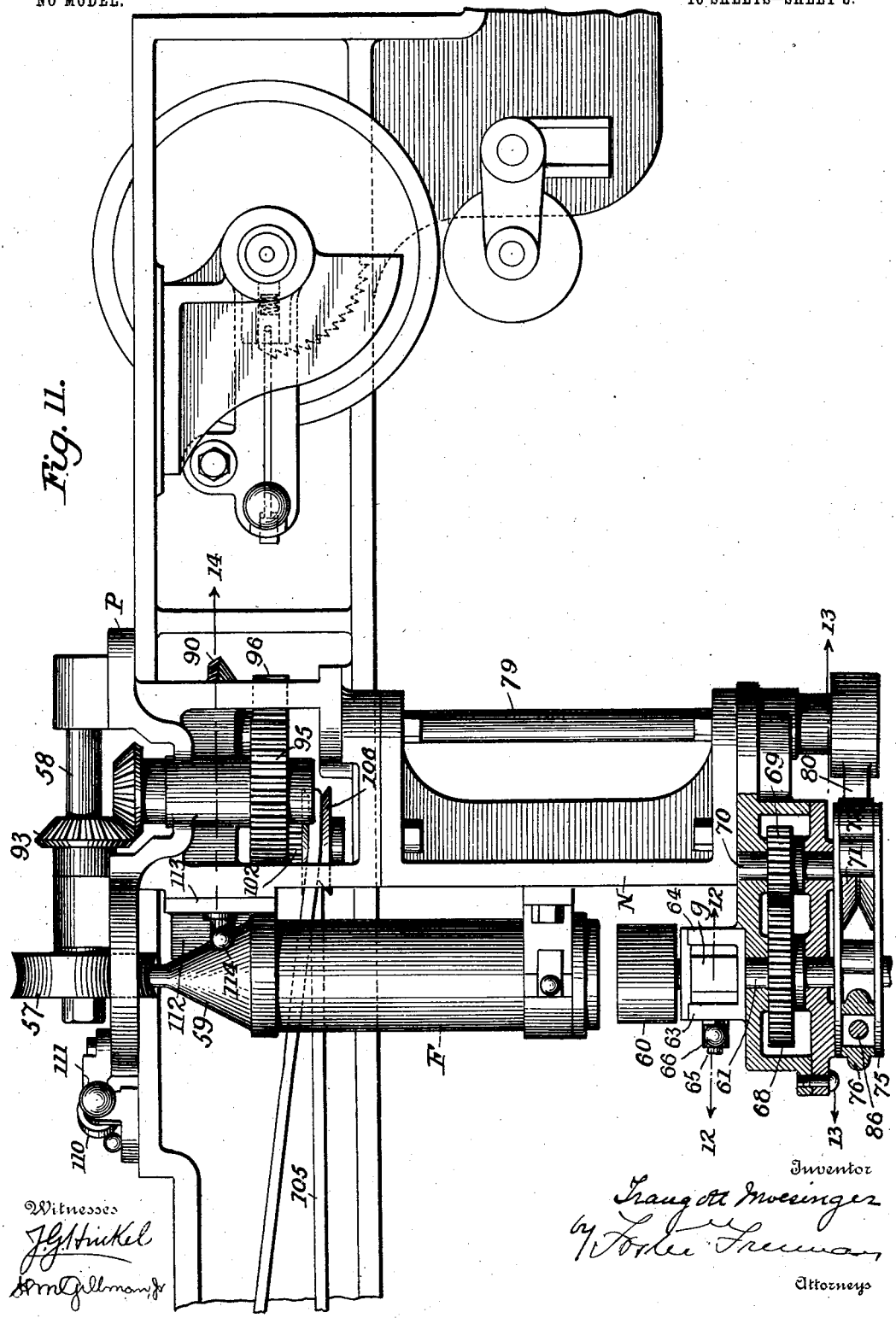

No. 739,897. PATENTED SEPT. 29, 1903.
T. MOESINGER.
CIGARETTE MACHINE.
APPLICATION FILED MAR. 13, 1900. RENEWED MAR. 6, 1902.
NO MODEL. 10 SHEETS—SHEET 7.
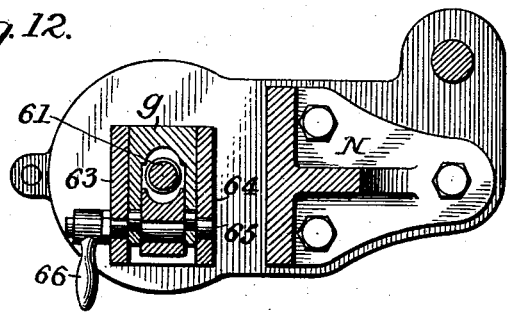
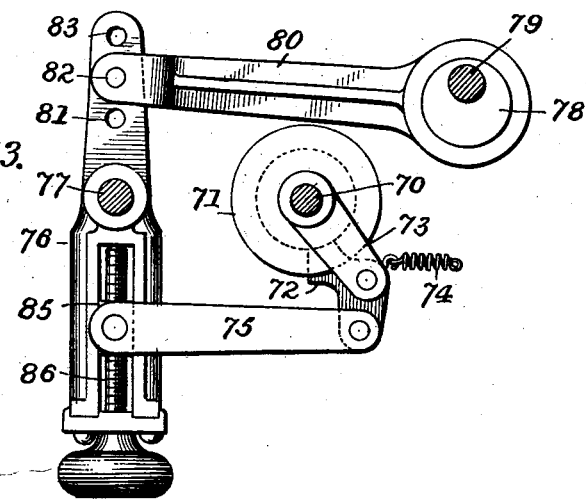
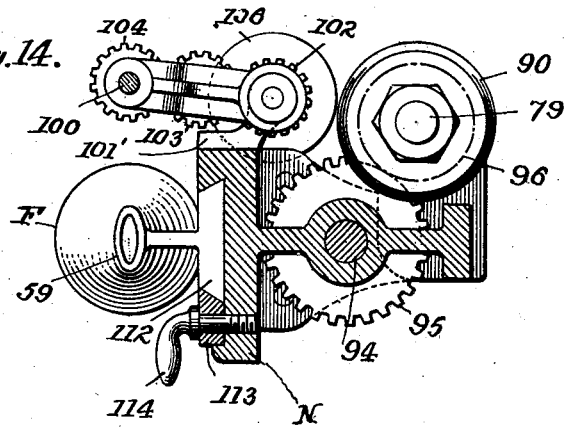

No. 739,897. PATENTED SEPT. 29, 1903.
T. MOESINGER.
CIGARETTE MACHINE.
APPLICATION FILED MAR. 13, 1900. RENEWED MAR. 6, 1902.
NO MODEL. 10 SHEETS—SHEET 8.
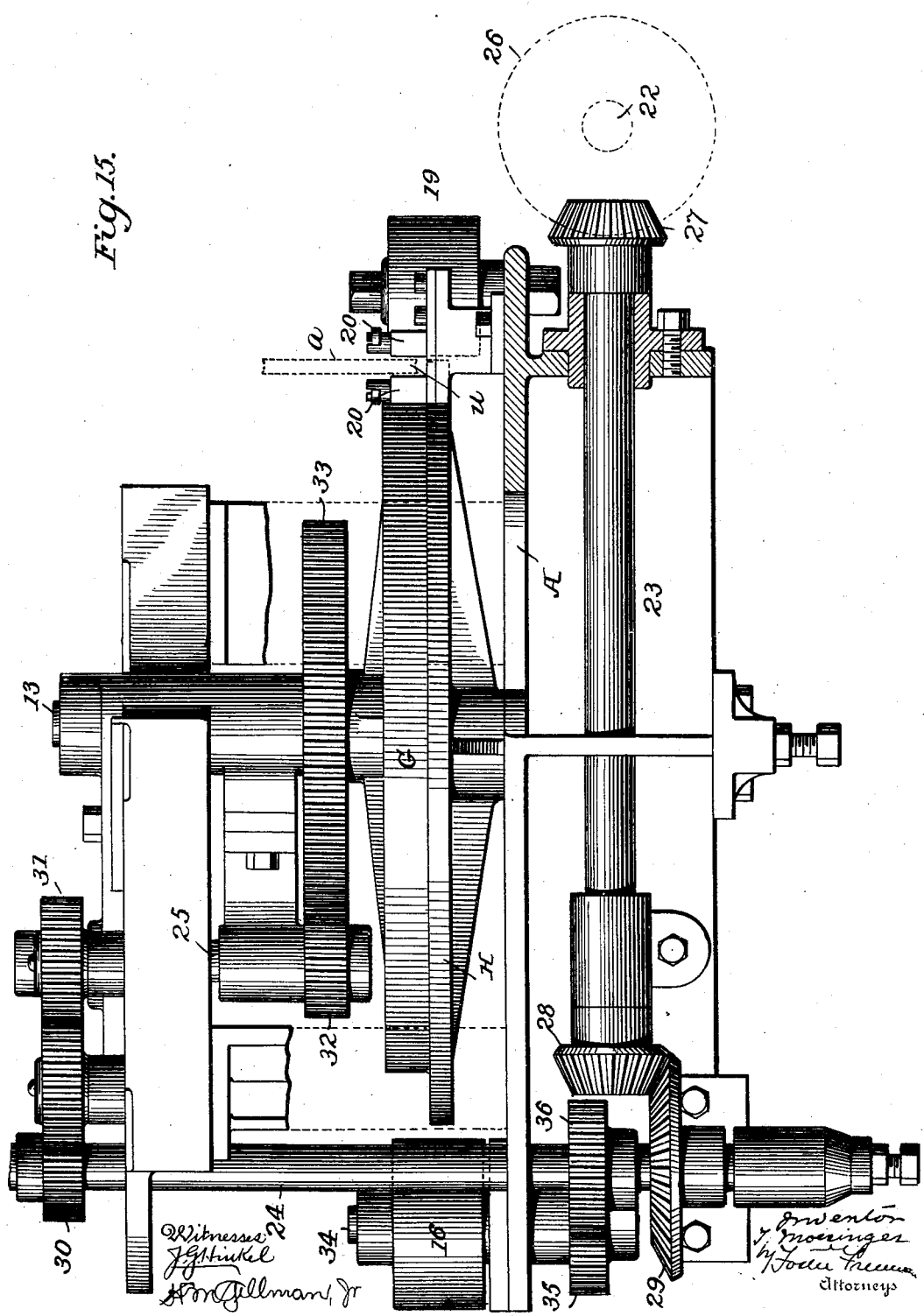

No. 739,897. PATENTED SEPT. 29, 1903.
T. MOESINGER.
CIGARETTE MACHINE.
APPLICATION FILED MAR. 13, 1900. RENEWED MAR. 6, 1902.
NO MODEL. 10 SHEETS—SHEET 9.

No. 739,897. PATENTED SEPT. 29, 1903.
T. MOESINGER.
CIGARETTE MACHINE.
APPLICATION FILED MAR. 13, 1900. RENEWED MAR. 6, 1902.
NO MODEL. 10 SHEETS—SHEET 10.
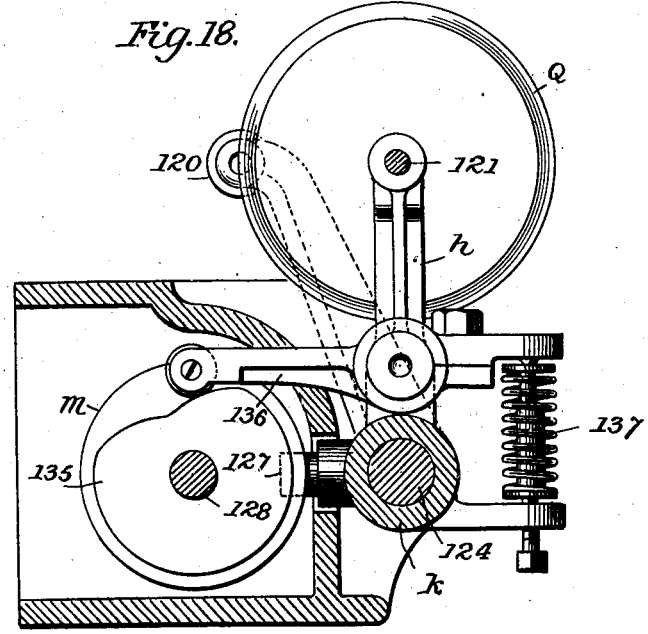
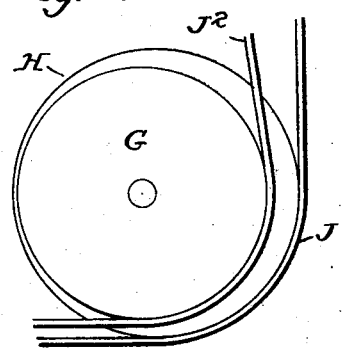
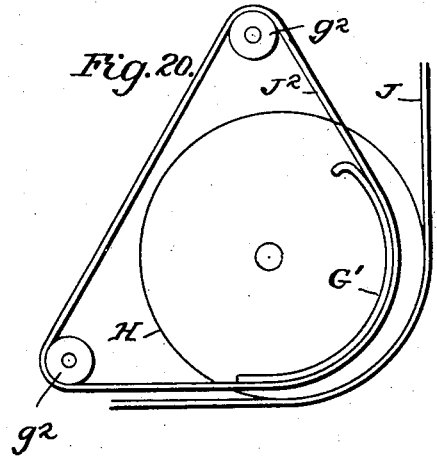

No. 739,897. Patented September 29, 1903.

UNITED STATES PATENT OFFICE.

TRAUGOTT MOESINGER, OF BROOKLYN, NEW YORK, ASSIGNOR OF ONE-THIRD TO GEORGE PHILLIPS, OF NEW YORK, N. Y.

CIGARETTE-MACHINE.

SPECIFICATION forming part of Letters Patent No. 739,897, dated September 29, 1903.

Application filed March 13, 1900. Renewed March 6, 1902. Serial No. 96,971. (No model.)

*To all whom it may concern:*

Be it known that I, TRAUGOTT MOESINGER, a citizen of the United States, residing at Brooklyn, in the county of Kings and State of New York, have invented certain new and useful Improvements in Cigarette-Machines, of which the following is a specification.

My invention relates to machines for making continuous cigarette-rods and cigarettes therefrom; and it consists of certain improved means for forming the tobacco filler, for applying and cementing the wrapper, and for cutting the same, as fully set forth hereinafter and as illustrated in the accompanying drawings, in which—

Figure 1:
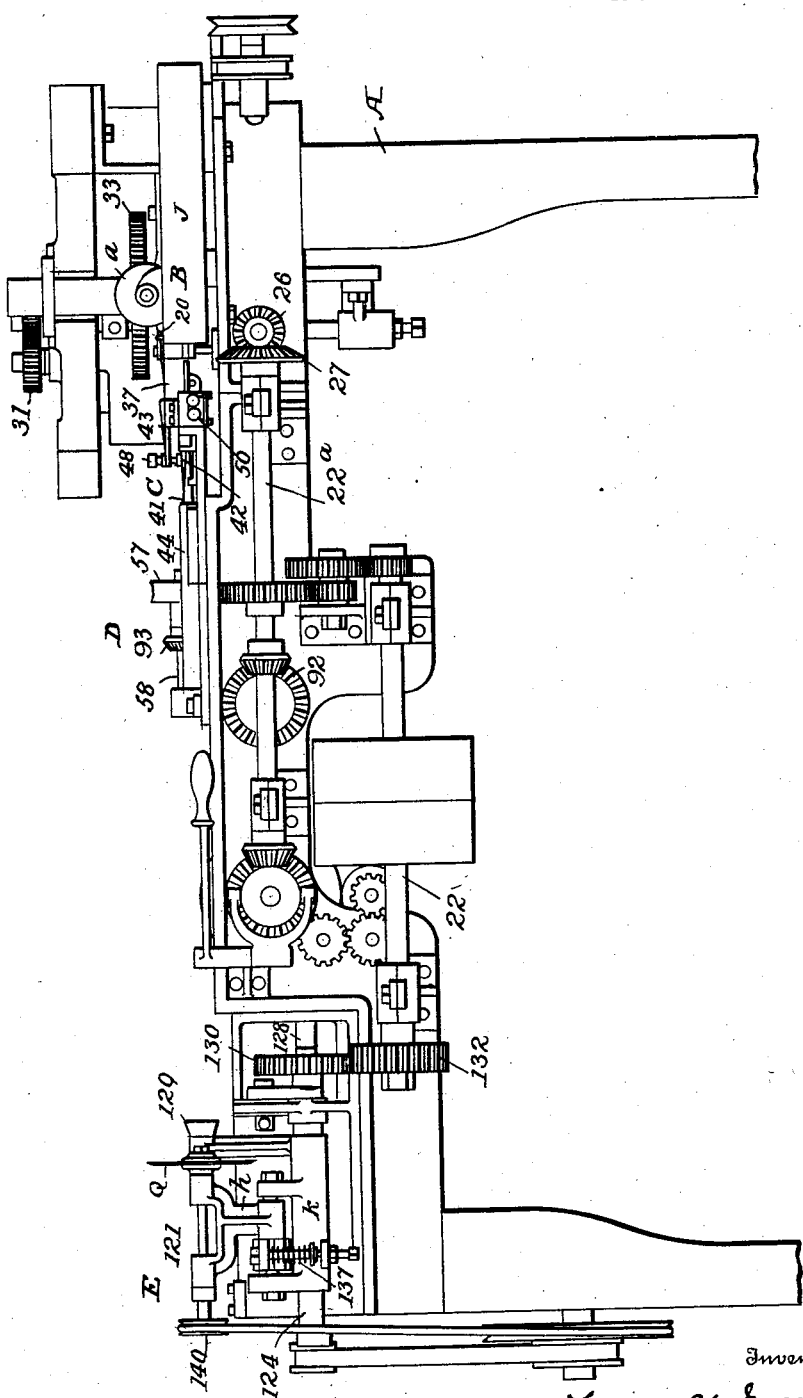
Figure 8:
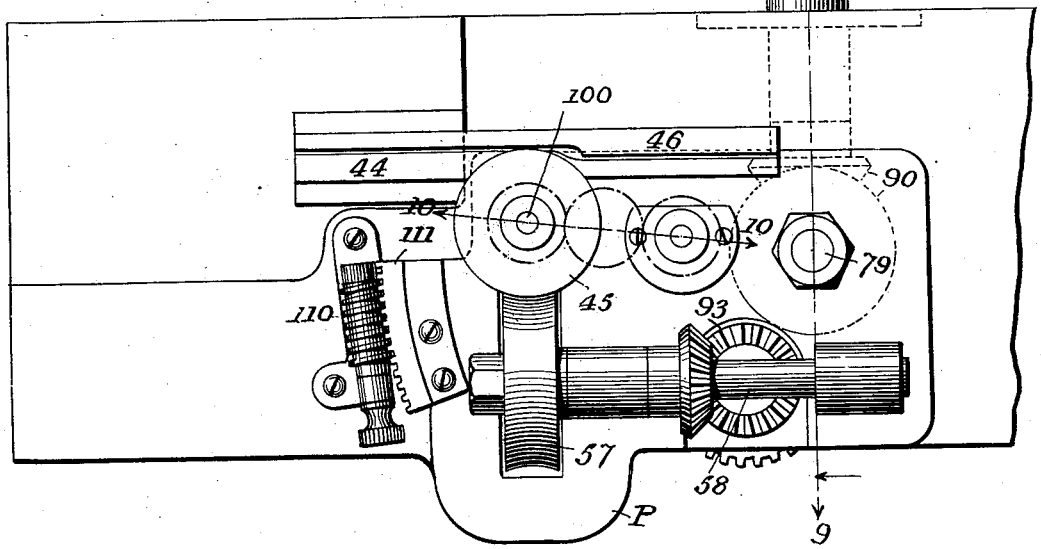
Figure 10:
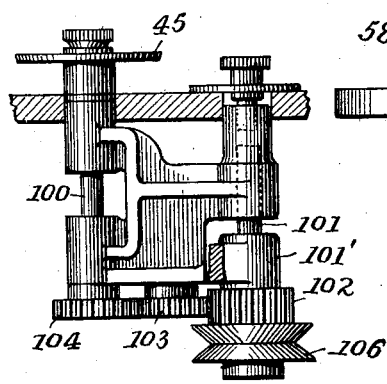
Figure 9:
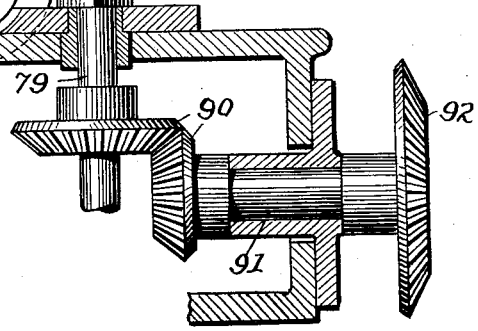
Figure 16:
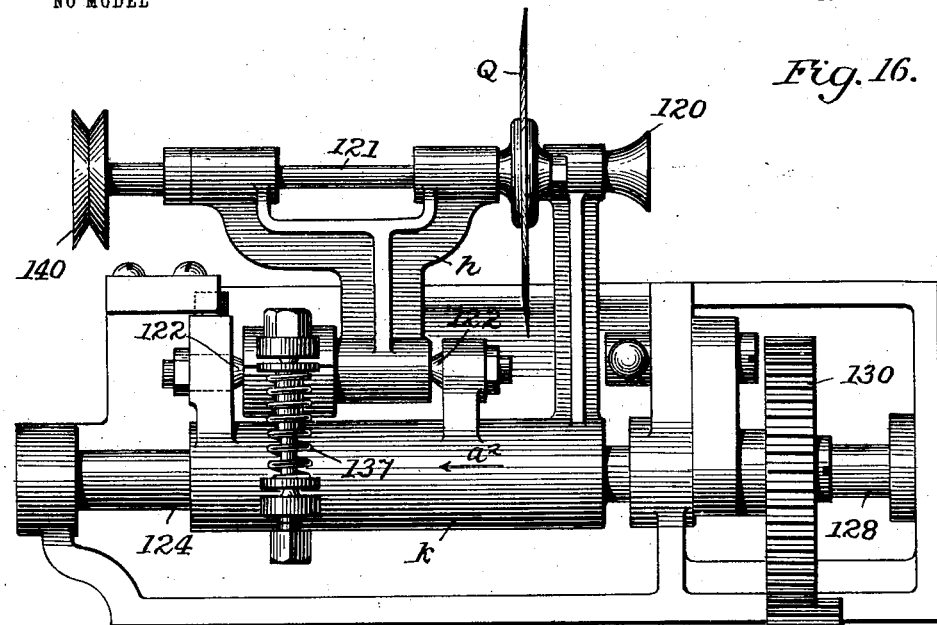
Figure 17:
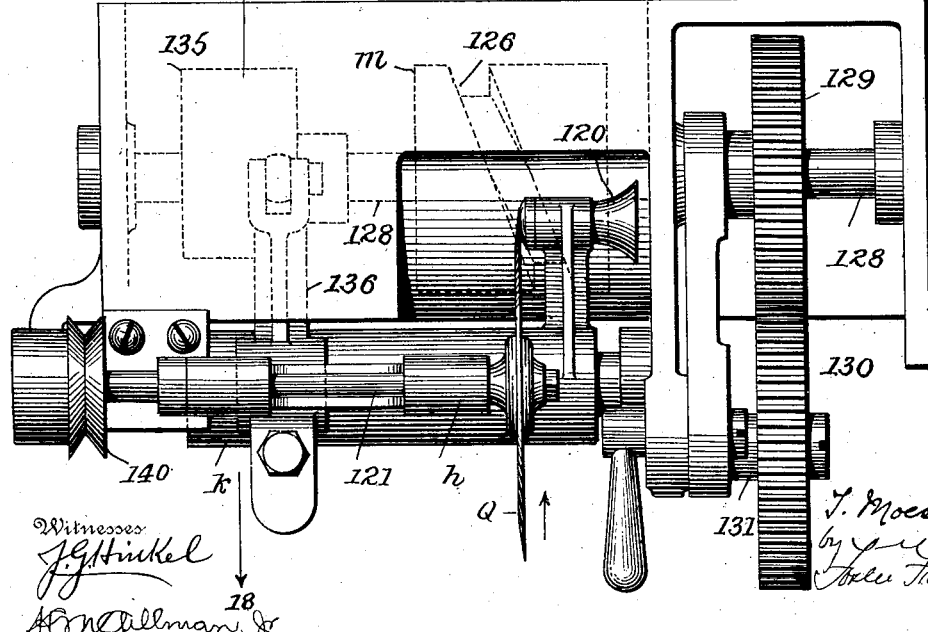

Figure 1 is an elevation of a cigarette-machine embodying my improvements; Fig. 2, a plan view; Fig. 3, a plan in part section of the filler-forming mechanism; Fig. 4, a cross-section on the line 4 4, Fig. 3; Fig. 5, a plan of the wrapper devices and adjacent parts; Fig. 6, a cross-section on the line 6 6, Fig. 5; Fig. 7, a side view of the parts shown in Fig. 5; Fig. 8, a plan of the paster devices; Fig. 9, a section on the line 9 9, Fig. 8; Fig. 10, a section on the line 10 10, Fig. 8; Fig. 11, a side view, in part section, of the paster devices; Fig. 12, a sectional plan on the line 12 12, Fig. 11; Fig. 13, a sectional plan on the line 13, Fig. 11; Fig. 14, a part sectional plan on the line 14, Fig. 11; Fig. 15, a cross-section on the line 15, Fig. 5; Fig. 16, a side view of the cutter devices; Fig. 17, a plan view of the cutter devices; Fig. 18, a cross-section on the line 18 18, Fig. 17. Figs. 19 and 20 illustrate modifications of the filler-compressing device.

The table A supports the tobacco-compressing devices B, the wrapping devices C, the pasting devices D, and the cutting devices E, which I will now proceed to describe in their order.

*The tobacco-compressing devices.*—The tobacco is discharged from the feeder into a chute F, having a curved outlet $x$, Fig. 3, upon a horizontal plane, which is above a carrier-wheel G, supported by a shaft 13, driven in any suitable manner, and below which is a carrier-disk H, of greater diameter, supported by a shaft 14, the axis of which is eccentric to the axis of the shaft 13, so that the peripheries of the wheel G and disk H converge from a point below the chute-opening $x$ to a point where a grooved presser-wheel $a$ is arranged in contact with the vertical face $y$ of the carrier-wheel a short distance above the upper face of the disk H. Against the opposite face of the presser-wheel $a$ bears a vertical belt J, which lies against the periphery $w$ of the disk H, projecting above the latter from the point adjacent to the presser-wheel $a$ to a point beyond the end of the chute-opening $x$, the said belt passing around guide-rolls 16, 17, 18, and 19, the latter arranged to deflect the belt after it has passed in contact with the presser-wheel $a$.

It will be seen that by the above arrangement a lune-like or crescent-like chamber is formed open at the top, its widest portion below the opening $x$ closed at one side by the face $y$ of the carrier-wheel G, at the opposite side by the belt, and at the bottom by so much of the face of the disk H as projects beyond the periphery of the wheel G. It therefore follows that the tobacco discharged through the opening $x$ into the space will be carried around upon the top of the disk H and between the periphery of the wheel G and the vertical belt J and will be gradually compressed without any friction tending to displace the particles and will finally be carried beneath the presser-wheel $a$ and be condensed thereby in the contracted space between the belt, the wheel G, and the disk H into a tobacco-rod, which is delivered onto the table and moves forward into the short channel $u$, at the sides of which are spring-actuated blocks 20 20, that prevent any possible spreading of the rod.

To properly guide the belt and maintain it in form and prevent the upper edge from bending inward from any cause, one or more plates $J^5$ are arranged above the upper edge of the belt with short curved ribs 21, the outer faces of which are curved to correspond to a circle concentric with the axis of the disk H, affording bearings for the belt, as shown in Fig. 4.

A belt-tightener K is arranged at any suitable point to bear upon the belt and is constructed in any suitable manner to maintain the belt taut.

The shaft of the carrier-wheel G is supported by an overhanging part of the framework and is driven from the main driving-shaft 22 at the side of the machine through the medium of shafts 23, 24, and 25 and gears 26, 27, 28, 29, 30, 31, 32, and 33; but movement may be imparted thereto in any other suitable manner. The belt J also is positively driven, the pulley 16 being upon a shaft 34, driven by gears 35 36 from the shaft 24, the disk H being driven by frictional contact with the belt. After passing through the channel $u$ the rod passes between two vertical guide-plates 37 37 to the wrapper mechanism.

*The wrapping devices.*—Below the plates 37 37 is a guiding-roller 40, around which passes the feed-belt L to the top of the table, carrying with it the strip of paper constituting the wrapper Y, the belt, with the wrapper upon it, passing through the conical portion of the folder O, which consists of a horizontal plate 41, nearly flat at the end that is below the plates 37 and contracted nearly into an open tube toward the opposite end, and a semiconical plate 42, supported by and beneath a bracket 43, curved downward and lying within the upwardly-bent converging sides of the plate 41 without contact therewith, so that the edges of the wrapper may travel between the edges of the plate 42 and the curved-up portions of the plate 41, one edge of the wrapper being brought to a vertical position, while the opposite edge is turned over onto the tobacco rod or filler. The rod and wrapper are carried in this condition through one portion of the folding-tube 44, with the standing edge of the wrapper passing through a slot $x^2$ at one side near the receiving end and past the pasting-wheel 45, which applies paste to the inner face of the standing edge of the wrapper, which is then folded down upon and cemented to the other inturned side of the wrapper by the overhanging portion 46 of the folder-tube.

The plate 42 of the folding device is hinged or pivoted to a lug 47, projecting from the bracket 43, near the wide end of the plate and is adjusted vertically at the other end by means of an adjusting-screw 48, extending through the end of the bracket 43. An adjusting-screw 50 is provided with an annular recess to receive a fork 51 on a slide 53, which extends transversely and carries the feed-belt guides 53$^a$, the said screw 50 extending into a threaded opening in the top plate or table A, so that by turning said screw the feed-belt may be adjusted laterally. Another adjusting-screw 54 is the means of adjusting a slide 52, which has guides 55 for the paper strip. Arms 55$^a$ may extend from the slide 52 opposite the ends of the roller 40, and by this means the latter may be shifted to vary its position.

*The pasting devices.*—The paste is delivered to the paste-wheel 45 by means of a carrier-wheel 57, the axis of which is at right angles to that of the paste-wheel and the periphery of which is grooved to coincide with the periphery of the paste-wheel, which lies horizontally, the carrier-wheel 57 being secured to and carried by a horizontal shaft 58. The conical nozzle 59 of a paste-cylinder F is formed to fit close to the periphery of the carrier-wheel 57 and is provided with a piston or plunger 60, which as it rises forces the paste out of the nozzle against the periphery of the wheel 57, from which it is delivered onto the periphery of the paster-wheel. By this means the paste is uniformly spread and uniformly delivered to the periphery of the paste-wheel 45, while any excess of paste at any time will pass to the top of the paster-wheel 45, from which it may be readily scraped off.

Any suitable means may be employed for bringing the piston 60 upward. As shown in Fig. 11, the parts connected with the piston 60 are carried by a bracket N, which supports a divided nut $g$, the grooved faces of which are adapted to the threaded shaft 61, connected to the piston, so that when the two sections of the nut are brought into contact with the shaft and the latter is rotated the piston will be raised.

The two sections of the nut $g$ slide between guides 63 64 and are recessed to receive the crank portions of a shaft 65, turning in the guides 63 64 and provided with a handle 66, so that by rocking the shaft 65 to one position the screw-sections are separated, as shown in Fig. 12, permitting the screw-shaft to be readily drawn downward, while by rocking the shaft 65 in the opposite direction the parts of the nut are engaged with the shaft.

The screw-shaft 61 passes through a gear 68, but is splined, so that it may slide longitudinally, but turns with said gear, the latter being driven by a pinion 69 on a short shaft 70, carrying a grooved friction-wheel 71.

With the groove of the wheel 71 engages the wedge end of a dog 72, Fig. 13, carried by an arm 73, swinging on the shaft 70 and drawn in one direction by a spring 74. The other end of the dog is connected by a connecting-rod 75 with a lever 76, vibrating on a fixed stud 77, a vibrating movement being imparted thereto from an eccentric 78 on a shaft 79 through the medium of a rod 80, provided with a strap encircling the eccentric.

The extent of vibration of the lever 76 may be varied by connecting the end of the rod 80 to different points 81 82 83 of the lever 76 but a finer adjustment may be secured by connecting the end of the rod 75 with a nut 85, which may be carried longitudinally to different positions upon the lever 76 by means of a feed-screw 86.

The shaft 79 is driven by a pair of bevel-gears 90, one on said shaft and the other on the shaft 91, driven by a pair of bevel-wheels 92 from the main driving-shaft 22, as shown in Fig. 8.

The shaft 58, carrying the paster-carrier wheel 57 is driven by a pair of bevel-wheels 93 from a shaft 94, the gear 95 on which meshes with a gear 96 on the shaft 79, Fig. 11.

The paste-wheel 45, Fig. 10, is carried by a shaft 100, driven from a shaft 101 through the medium of pinions 102, 103, and 104, the shaft 101 being driven by a belt 105 engaging a grooved pulley 106 at the lower end of said shaft, the said belt passing to a driving-pulley 107, driven from any moving part of the machine.

The shafts above described connected with the pasting mechanism may turn in fixed bearings; but preferably all of the shafts except the shaft 79 are carried by movable bearings connected with a plate P, Fig. 8, lying upon the table and swinging around the shaft 79, the adjustment being effected by means of a feed-screw 110, turning in bearings upon the table and engaging a curved rack 111, secured to the plate P. This permits the paste-wheel 45 to be carried to and from the standing edge of the wrapper-strip without altering the adjustment or relations of any other parts of the pasting devices, the bracket N in such case being pendent from and connected with the plate P.

To adjust the paste-cylinder properly in its relation to the paste-carrying wheel 57, the said cylinder is carried by a bracket 112, Fig. 14, sliding between guides 113 on the bracket N, one of the said guides being loose and clamped in place by a screw 114, by means of which the parts may be secured after adjustment.

*The cutting devices.*—The cigarette-rod passes after being completed into a flaring sleeve 120, carried by a carriage $k$, and across the outer end of which passes at proper intervals the oscillating rotating cutter Q, carried by a shaft 121 upon a bracket $h$, which vibrates upon pointed bearings 122, carried by the carriage $k$, which slides back and forth upon a guide-rod 124.

As the cutter-disk Q moves in the direction of its arrow, Fig. 17, to make contact with and shear the cigarette-rod the carriage $k$ is simultaneously moved in the direction of its arrow $a^2$, Fig. 16, at the same speed at which the cigarette-rod travels, so that the cut is made at right angles to the axis of the cigarette rod.

Any suitable means may be employed for reciprocating the carriage $k$. As shown, there is a cam $m$, Fig. 18, with a groove 126, which receives a roller-stud 127 on the carriage $k$, and this cam is upon a shaft 128, carrying a toothed wheel 129, gearing with a wheel 130, turning on a stud 131 and driven by a broad-faced gear-wheel 132, carried by the main shaft 22. The rocking motion is imparted to the bracket $h$ by a cam 135 on the shaft 128, upon which bears an antifriction-roller at the end of an arm 136, extending from the bracket $h$, the opposite end of said arm bearing upon a spring 137, which may be adjusted to increase or decrease the tension.

The cutter-shaft 121 is provided with a grooved pulley 140, driven by means of a belt from any driving-pulley at any suitable part of the machine.

To insure the contact of the belt J with the side of the presser-wheel $a$, Fig. 3, a yielding bearing is employed, which, as shown, consists of two presser-rolls 115, carried by a pivoted bracket 116, forced inward to press the rolls against the belt by a spring 117.

While the folder which folds the wrapper about the filler-rod may be fixed, great advantage results from the capacity to be tilted to different positions about the axis of the filler. I therefore prefer to support the folder O by a frame Q', Fig. 6, exteriorly curved to fit the curved faces $g'$ of a socket in the bed-plate, said faces coinciding with a circle, of which the filler is the center, whereby said frame and the folder may be rocked to any desired position about the filler to insure the belt and wrapper taking and traveling in their proper positions. The frame Q' may be secured in place after adjustment by any suitable means, as a set-screw $54^a$, Fig. 5. In this case the devices for guiding and adjusting the belt are also carried by the frame Q'.

While I have shown in Figs. 1 to 4 one means for securing a lune-shaped gradually-contracting channel or space for compressing the tobacco to form a filler-rod, the same result can be secured by modifying some of the details. Thus, as shown in Fig. 19, an endless belt $J^2$ may lie against the face of the wheel G, or, as shown in Fig. 20, it may move over a curved support G', being driven by driving-rolls $g^2$ $g^2$.

Without limiting myself to the precise construction shown and described, I claim—

1. The combination in a cigarette-machine, of filler-compressing means comprising two perpendicular traveling elements forming curved surfaces inclosing a lune-shaped space between them and extending from a traveling support forming the bottom of said space and a vertical presser-wheel between the said surfaces and toward which said surfaces converge, substantially as set forth.

2. The combination in a device for compressing cigarette-rods, of a rotating wheel and a rotating disk below the wheel and eccentric thereto, a belt lying on the edge of the disk and having a flat face extending upward therefrom perpendicular to the upper face of the disk to inclose a lune-shaped channel between said periphery and the belt, and a compressing-wheel arranged in said channel above the bottom thereof and toward which the curved side faces converge, substantially as set forth.

3. The combination of the disk H, the wheel G resting thereon eccentric thereto, an endless belt traveling in contact with the periphery of the disk and projecting upward opposite the periphery of the wheel, guide-pulleys for the belt, a presser-wheel $a$ and a yielding bearing for the belt opposite said wheel $a$, and means for positively driving the wheel and belt, substantially as described.

4. The combination of the disk H, the wheel G resting thereon eccentric thereto, an endless belt traveling in contact with the periphery of the disk and projecting upward opposite the periphery of the wheel, guide-pulleys for the belt, a presser-wheel $a$ and rollers bearing on the belt and carried by a bracket, and a spring forcing said bracket and rollers toward the wheel $a$, substantially as set forth.

5. The combination of the wheel and disk arranged eccentrically, a belt bearing on the edge of and projecting above the disk, and a plate above and extending inwardly over the belt provided with a downwardly-extending curved guide-rib 21, substantially as described.

6. The combination of a wheel, a disk below and eccentric to the wheel, endless belt bearing on and projecting above the edge of the disk, guide-pulleys for the belt, vertical presser-wheel $a$ between the belt and edge of the wheel, and blades 20, 20 beyond the wheel $a$, substantially as set forth.

7. The combination with the belt and paper-feed devices of a cigarette-machine, of a folder having a rocking frame or block carrying the folding-blades to tilt the blades to different positions axially about the filler-rod, substantially as set forth.

8. The combination with means for forming a continuous filler-rod, of a folder for carrying the feed-belt and for carrying the wrapper and for folding the wrapper around the filler, and provided with a frame adjustable about the horizontal axis of the filler, substantially as set forth.

9. The combination in the folder, of a rocking frame adapted to tilt to different positions axially about the filler-rod, and means for supporting the belt and wrapper carried by the belt also supported by the frame, substantially as set forth.

10. The combination in the folder, of a rocking frame adapted to tilt to different positions axially about the filler-rod, and adjustable means for supporting the belt and wrapper carried by the belt also supported by said frame, substantially as set forth.

11. The combination with the paste-cylinder, and its screw-shaft and nut, of a friction-wheel 71, and connections for rotating said screw-shaft therefrom, comprising a pawl carried by a lever 73 and engaging said friction-wheel, a vibrating lever 76, a rod connected with the lever 73, and a nut 85 connected with said rod and screw on the lever 76 carrying said nut 85, substantially as set forth.

In testimony whereof I have signed my name to this specification in the presence of two subscribing witnesses.

TRAUGOTT MOESINGER.

Witnesses:
F. L. FREEMAN,
H. M. GILLMAN, Jr.